United States Patent
Laming et al.

(10) Patent No.: US 6,549,705 B1
(45) Date of Patent: Apr. 15, 2003

(54) FABRICATION OF OPTICAL WAVEGUIDE GRATINGS

(75) Inventors: Richard Ian Laming, Edinburg (GB); Morten Ibsen, Hampshire (GB)

(73) Assignee: Pirelli Cavi e Sistemi S.P.A., Milan (IT)

(*) Notice: Subject to any disclaimer, the term of this patent is extended or adjusted under 35 U.S.C. 154(b) by 0 days.

(21) Appl. No.: 09/556,828

(22) Filed: Apr. 21, 2000

Related U.S. Application Data

(63) Continuation of application No. PCT/GB98/03176, filed on Oct. 23, 1998.

(30) Foreign Application Priority Data

Oct. 24, 1997 (GB) .............................................. 9722550

(51) Int. Cl.[7] .............................................. G02B 6/34
(52) U.S. Cl. ........................................ 385/37; 430/290
(58) Field of Search .............................. 385/37; 430/290

(56) References Cited

U.S. PATENT DOCUMENTS

| | | | | |
|---|---|---|---|---|
| 5,104,209 A | * | 4/1992 | Hill et al. ....................... | 385/27 |
| 5,327,515 A | * | 7/1994 | Anderson et al. ........... | 385/123 |
| 5,367,588 A | | 11/1994 | Hill et al. | |
| 5,482,801 A | | 1/1996 | Smith et al. | |
| 5,655,040 A | | 8/1997 | Chesnoy et al. | |
| 5,768,454 A | | 6/1998 | Chesnoy et al. | |
| 5,818,988 A | * | 10/1998 | Modavis ....................... | 385/37 |

FOREIGN PATENT DOCUMENTS

| | | | |
|---|---|---|---|
| EP | 0 684 491 | 11/1995 | |
| EP | 0 782 018 | 7/1997 | |
| GB | 2 272 075 A | 5/1994 | |
| GB | 2 316 760 A | 3/1998 | |
| WO | WO 00/29984 | * 5/2000 | ............ G02B/6/18 |

OTHER PUBLICATIONS

J.R. Armitage, "Fibre Bragg Reflectors Written at 262nm Using a Frequency Quadrupled Diode–Pumped $Nd^{3+}$: YLF Laser", Electronic Letters, vol. 29, No. 13. pp. 1181–1183, Apr. 1993.

N.H. Rizvi et al., "Excimer Laser Writing of Submicrometre Period Fibre Bragg Gratings Using Phase–Shifting Mask Projection", Electronic Letters, vol. 31, No. 11, pp. 901–902, Mar. 1995.

G. Meltz et al., "Formation of Bragg Gratings in Optical Fibers by a Transverse Holographic Method", Optic Letters, vol. 14, No. 15, Aug. 1, 1989, pp. 823–825.

(List continued on next page.)

*Primary Examiner*—John D. Lee
*Assistant Examiner*—Sarah V Song

(57) ABSTRACT

An optical grating fabrication apparatus having a phase mask for dividing an incident light beam into a plurality of diffracted beams and a focusing arrangement for receiving light from the phase mask and converging at least two non-zero-order diffracted beams together so as to generate an interference region of a characteristic period between the converged beams so that a grating structure can be impressed on an optical waveguide placed in the interference region. Further, a translation stage is arranged to move the phase mask and at least a part of the focusing arrangement with respect to one another under control of a control circuit so as to alter the angle of convergence of the converged beams and thus controllably tune the characteristic period.

10 Claims, 6 Drawing Sheets

OTHER PUBLICATIONS

D.Z. Anderson et al., "Production of In–Fibre Gratings Using a Diffractive Optical Element", Electronics Letters, vol. 29, No. 6, Mar. 18, 1993, pp. 566–568.

K.O. Hill et al, "Bragg Gratings Fabricated in Monomode Photosensitive Optical Fiber by UV Exposure through a Phase Mask", Appl. Phys. Lett. 62 (10), Mar. 8, 1993, pp. 1035–1037.

B. Malo et al., "Point–by–Point Fabrication of Micro–Bragg Gratings in Photosensitive Fibre Using Single Excimer Pulse Refractive Index Modification Techniques," Electronics Letters, vol. 29, No. 18, Sep. 2, 1993, pp. 1668–1669.

M.M. Broer et al., "Ultraviolet–induced Distributed–feedback Gratings in $Ce^{3+}$–doped Silica Optical Fibers," Optics Letters, vol. 16, No. 18, Sep. 15, 1991, pp. 1391–1393.

J.D. Prohaska et al., "Magnification of Mask Fabricated Fibre Bragg Gratings", Electronics Letters, vol. 29, No. 18, Sep. 2, 1993, pp. 1614–1615.

M.J. Cole et al., "Moving Fibre/Phase Mask–scanning Beam Technique for Enhanced Flexibility in Producing Fibre Gratings with Uniform Phase Mask," Electronics Letters, vol. 31, No. 17, Aug. 17, 1985, pp. 1488–1490.

F. Ouellette et al., "Characterization of Long Phase Masks for Writing Fiber Bragg Gratings," Optical Fiber Technology 2, (1996), Article No. 0034, pp. 281–284.

\* cited by examiner

FABRICATION OF OPTICAL WAVEGUIDE GRATINGS

This application is a continuation of International Application No. PCT/GB98/03176, filed Oct. 23, 1998, the content of which is incorporated herein by reference.

This invention relates to methods and apparatus for fabricating optical waveguide gratings.

Optical waveguide gratings, such as optical fibre gratings, can be formed by exposing the core of an optical fibre to an interference pattern defining the period of the grating. The first experimental demonstration of fibre grating formation in the core of an optical fibre was by launching laser light along an optical fibre from an Argon-ion laser operating at 514 nm, so that a grating was formed over the entire length of the fibre.

More recent techniques have used interference patterns incident on the side of the fibre to impress a grating structure on photosensitive regions within the fibre core and/or cladding.

The methods used to generate such an interference pattern have included prism-interferometers [see publication reference "Broer" cited below], diffraction grating/phase-masks [Anderson] and combined phase-mask and prism-interferometers [Armitage]. A further development is described in GB-A-2 272 075, where a phase mask is imaged onto the fibre core using a lens.

However, an established problem is that of tuning the pitch of the grating in the fabrication process—for example, to generate a long (several centimetres or more) chirped grating where the pitch varies along the length of the grating.

This is a very difficult task with an multi-beam interferometer, because the coherence length of the writing laser beam makes careful matching of the different optical paths critical to maintaining a good visibility of the generated interference pattern.

Tuning of the grating pitch from uniform phase masks have been reported before from both a phase mask magnification technique [Prohaska] and a tuning scheme based on a beam diameter dependant maximum tuning [Cole and GB9509874.5]. In both cases the maximum tuning possible is~(about) 10 nm (nanometres) with the latter system being the more flexible.

The present invention provides optical grating fabrication apparatus comprising a phase mask for dividing an incident light beam into a plurality of diffracted beams; and a focusing arrangement for receiving light from the phase mask and converging at least two non-zero-order diffracted beams together so as to generate an interference region between the converged beams so that a grating structure can be impressed on an optical waveguide placed in the interference region;

the phase mask and at least a part of the focusing arrangement being moveable with respect to one another so as to alter the angle of convergence of the converged beams.

In the invention, a phase mask is imaged onto the waveguide using a lens. However, rather than the usual step of fixing the relative positions of the phase mask and lens to a separation equal to the focal length of the lens (which would normally be expected for maximum mechanical stability of the system), the counter-intuitive step is. taken of altering the separation of the phase mask and lens to alter the angle of convergence of the conversed beams. The skilled man will immediately then understand that this in turn alters the fringe pitch incident on the waveguide.

Prototype embodiments of the invention can demonstrate a tuning range of 27 nm, i.e. about three times the best tuning range so far reported.

The advantages of the invention compared with other techniques used to write fibre Bragg gratings and in particular when used together with techniques where the fibre is moved in the interference pattern behind the either chirped or uniform phase- mask, e.g the 'Step and repeat' technique, by GB9617688.8, are that it provides no contact or close contact between the fibre and phase mask thereby avoiding the static electricity that builds up between moving glass surfaces.

By using a lens, the writing beam power can be focused more precisely onto the optical waveguide core of the grating host rather than through the side of e.g the optical fibre.

It has been known for two years before the priority date of this application [Ouellette] that the production of long phase-masks (>5 cm) is not possible with continuous techniques, and so step-write e-beam techniques must be employed. The repeat precision between concatenated sections, however, is not good enough to ensure a separation on the phase-mask period thereby introducing periodic 'stich-errors' along the length of the phase-mask. Imperfect overlap regions will cause phase-shifts that will reduce the quality of the gratings written from such a phase-mask. Even scanning along non-stitched phase-mask will limit the grating quality to the uniformity in the groove depth pattern of the phase-mask. A variation in the groove depth of the phase-mask will cause a power fluctuation in the zeroth-order hence power fluctuations in the interfering −1st and 1st orders of the phase-mask thereby leading to an increased background (dc) level in the grating and a reduction in the visibility of interference pattern. All these factors have tended to reduce the quality of the gratings produced. In contrast, the invention can avoid or alleviate this phase-mask grating quality degradation simply because the writing beam position on the phase-mask can be kept constant.

Although the invention can be embodied as a 'free-space' interferometer (sometimes perceived as a disadvantage), the invention can in fact be embodied using only a single lens to catch and recombine the interfering beams. Furthermore, the tuning scheme is advantageously simplified because it only includes a relative movement of the lens with respect to the phase mask. If this movement is made along the direction of the writing beam, the coherence between the two interfering beams is not affected.

The invention also provides an optical grating fabrication method comprising the steps of: directing a light beam onto a phase mask to divide the light beam into a plurality of diffracted beams; converging at least two non-zero-order diffracted beams together using a focusing arrangement so as to generate an interference region between the converged beams so that a grating structure can be impressed on an optical waveguide placed in the interference region; and providing relative movement between the phase mask and at least a part of the focusing arrangement so as to alter the angle of convergence of the converged beams.

The invention will now be described by way of example only with reference to the accompanying drawings in which.

Figure 1:
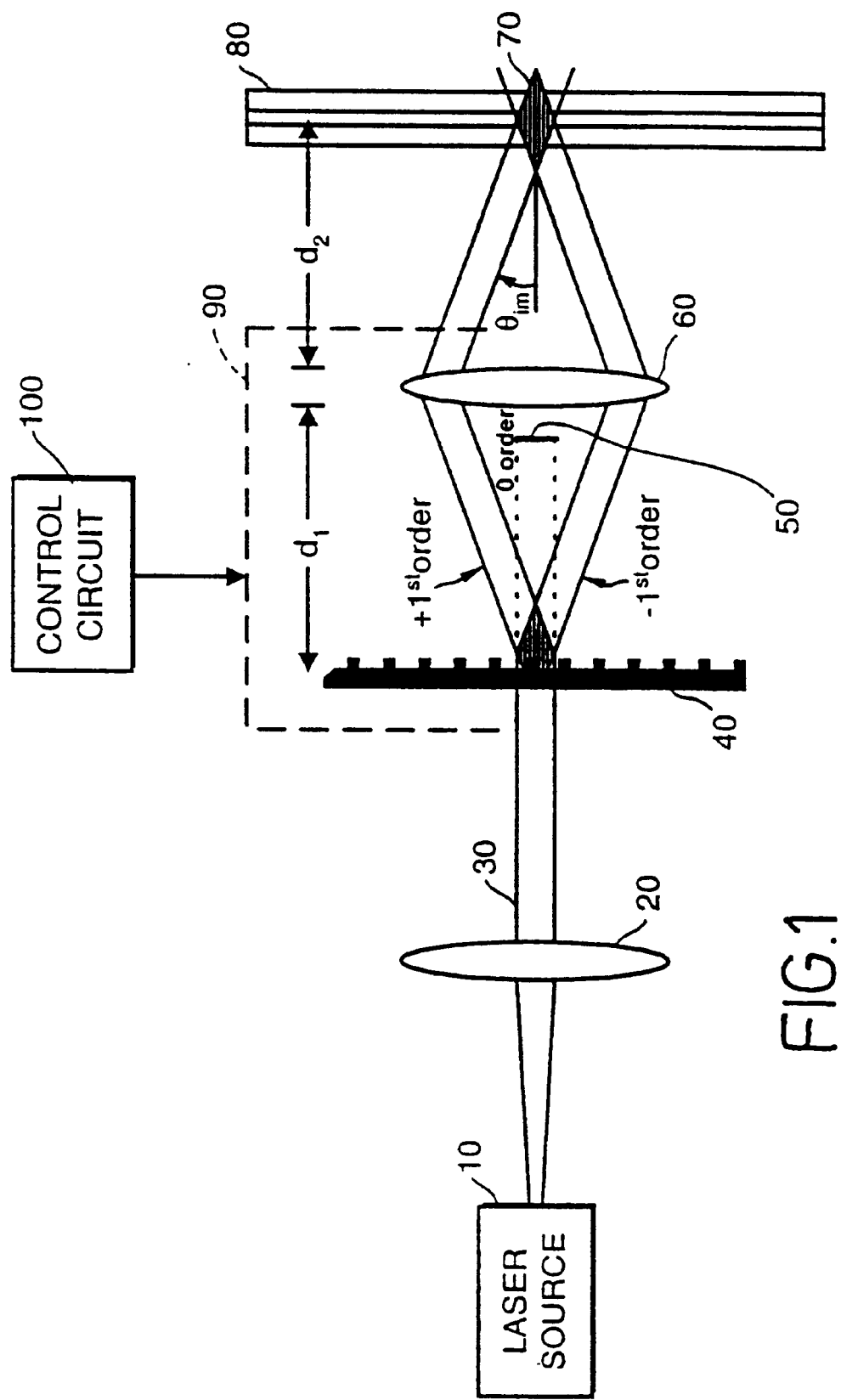
FIG. 1 is a schematic diagram of grating fabrication apparatus according to an embodiment of the invention.

Referring now to FIG. 1, a laser source (e.g. a UV laser source) 10 and a collimating lens 20 generate a collimated beam of UV light 30. The beam is incident on a phase mask 40, giving rise to so-called 0th-order, −1st order and 1st order diffracted beams (and possibly other higher order beams which are not relevant to the present explanation). The 0th order beam propagates in the same direction as the incident beam, whereas the −1st and 1st order beams are angularly deviated with respect to the incident beam, as illustrated.

An opaque block 50 is placed in the path of the 0th-order beam, so that only the −1st and 1st order beams are incident on an anti reflection coated biconvex spherical lens 60.

The −1st and 1st order beams incident on the lens 60 are brought to a focus in a region 70 overlapping the core (or other region in which a grating is to be impressed) of an optical fibre waveguide 80. An interference pattern is formed between the two beams, and a rating structure is written at the pitch of the interference fringes.

Apart from any translation stage (not shown) which may be used to scan the writing beam along the fibre (or vice versa—see GB9617688.8), the phase mask 40 and/or the lens 60 are mounted on a translation stage 90 (shown in schematic dotted line for clarity of the diagram) which, under the control of a control circuit 100, is arranged to alter the relative separation of the phase mask 40 and the lens 60. The effect of such a separation, and some experimental results obtained using this technique, will be described further below.

For the following discussions. the distance from the interference point on the phase-mask $P_1$ to the lens is denoted by $d_1$ and the distance from the lens to the image point $P_2$ is denoted by $d_2$. The period of the phase-mask is called $\lambda_{pm}$ and the focal length of the lens f. From the literature is known that the angle between the diffracted orders through the phase-mask is given by $$\theta_{pm} = \sin^{-1}\left(\frac{\lambda_i}{\lambda_{pm}}\right) \qquad (1)$$

with $\lambda_i$ being the wavelength of the light incident perpendicular on the phase-mask. The angle between the interfering −1 and 1 order is therefore $2\theta_{pm}$. The period of the interference is $$\Lambda = \frac{\lambda_i}{2 \cdot \sin(\theta_{pm})} \qquad (2)$$

The relation between the focal length f, $d_1$ and $d_2$ is according to the imaging equation given by $$\frac{1}{f} = \frac{1}{d_1} + \frac{1}{d_2} \qquad (3)$$

and therefore in the case, of 1:1 imaging of $P_1$ in $P_2$, $d_1=d_2=2f$.

To relate exemplary numbers to the equations presented above a phase-mask period of 1060 nm and UV-light of wavelength 244 nm is used. From (1) this gives a separation angle of 13.31° between the diffracted orders and therefore 26.62° between the −1 and 1 order. According to (2) this gives a period of 530 nm of the interference pattern. If a standard lens diameter D of 25.4 nmu (1 inch) is chosen the clear diameter $D_{cl}$ of a lens is typically the centre 85% of the diameter. Hence $D_{cl}$ is 21.6 mm. The maximum distance from the phase-mask to the lens is $d_{max}$:

$$\tan(\theta_{pm}) = \frac{\frac{1}{2} \cdot D_{cl}}{d_{max}} \qquad (4)$$

and therefore $$d_{max} = \frac{D_{cl}}{2\tan(\theta_{pm})} \qquad (5)$$
$$= 45.6 \text{ mm}$$

According to (3) the maximum focal length of a 1 inch lens then has $f_{max}$=22.8 mm.

Tuning of the period of the interfering beams and hence tuning of the Bragg wavelength can be achieved by varying the distance $d_1$. According to the imaging equation (3) the relation of $d_2$ for fixed f and varying $d_1$ is $$d_2(d_1) = \frac{f}{1-\frac{f}{d_1}}, \quad d_1 \in [f; d_{max}] \qquad (6)$$

If the beam is assumed to exit the lens at the same distance from the centre-axis of the lens as it enters it, as is the case of the thin-lens approximation, the relation between $\theta_{pm}$ and $\theta_{im}$, see FIG. 1, becomes $$\tan(\theta_{im}) \cdot d_2 = \tan(\theta_{pm}) \cdot d_1 \Leftrightarrow \theta_{im} = \tan^{-1}\left(\frac{d_1}{d_2} \cdot \tan(\theta_{pm})\right) \qquad (7)$$

Now an expression for the angle between the interfering beams in the imaging plane as function of $d_1$ has been obtained, an expression for the Bragg wavelength tuning as function of detuning from the 1:1 imaging case can be obtained. This expression becomes $$\Delta\lambda_B = n_{ave} \cdot \lambda_i \cdot \left(\frac{1}{\sin(\theta_{im})} - \frac{1}{\sin(\theta_{pm})}\right) \qquad (8)$$

where $n_{ave}$ is the average refractive index in the grating.

Figure 2:
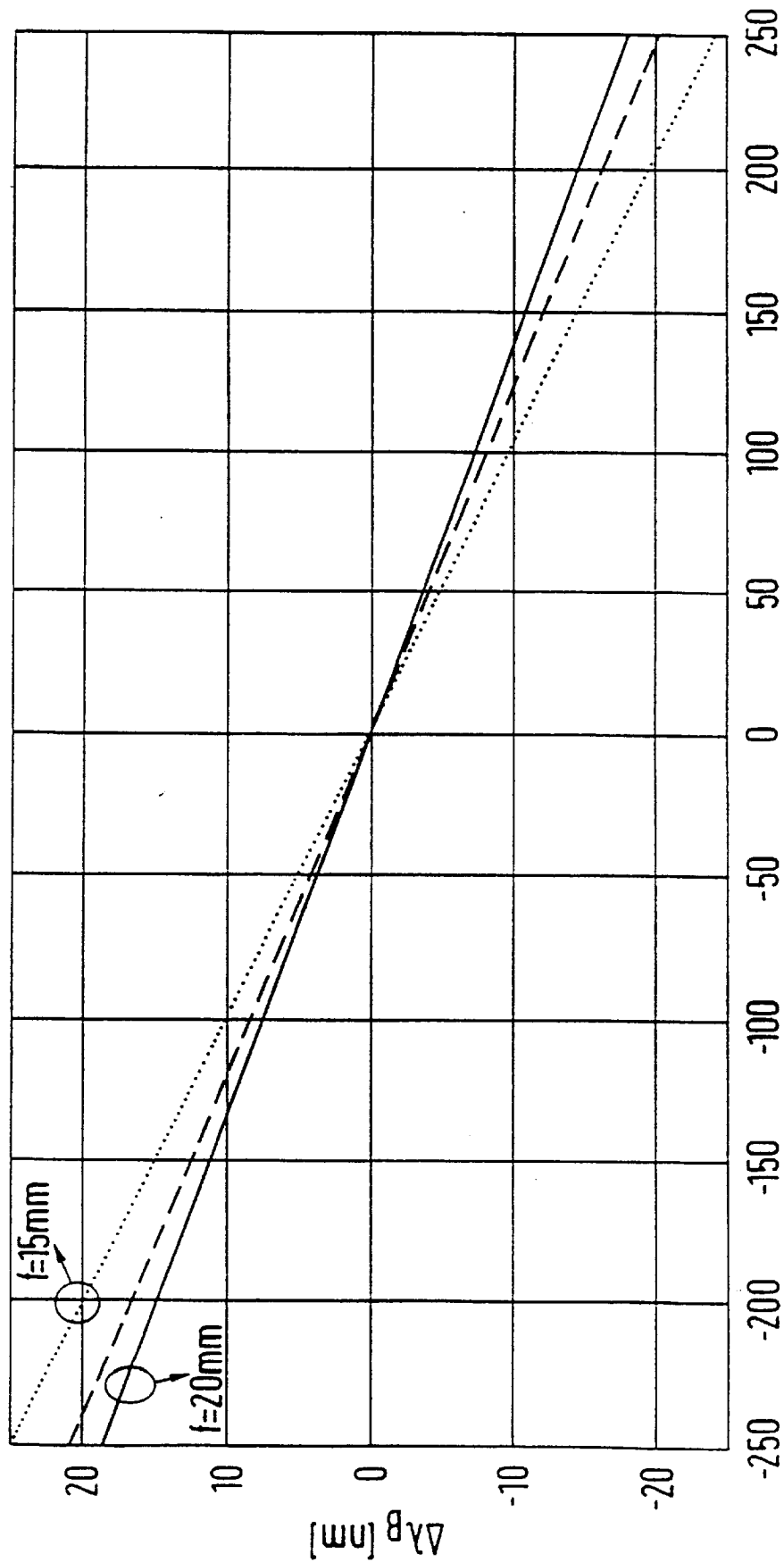
FIG. 2 is a graph showing theoretical tuning curves for relative lens movement.

FIG. 2 shows a graph of equation (8) for different values of f with $n_{ave}$=1.46. From FIG. 2 is seen that employing a shorter focal length lens gives a higher wavelength shift per unit length change and hence higher precision on the tuning of $d_1$ is required.

The maximum detuning to shorter wavelengths is obtained with $d_1=d_{max}$ giving the maximum angle between the interfering beams in the imaging plane. In principle any Bragg wavelength above the wavelength defined by the phase-mask can be achieved by tuning $d_1$ towards f.

One advantage of this method to tune the pitch of a phase-mask is that the width of the interfering beams is no more limited to the approx. 30 μm diameter beam in front of the phase-mask. This diameter is required in order to expose the fibre core with the interfering UV coming from the splitting angle of the orders from the phase-mask, see (1).

This method enables the interfering beams to be focused on the fibre core instead of on the side of the fibre and therefore have higher fluence in the region of interest. Another point is that very wide-band chirped gratings can be fabricated by scanning the lens during writing. Furthermore this technique optimises the writing of superstructure gratings that often requires grating subsection lengths down to ~20 µm.

Ideally, the translation stage 90 that controls the position of the lens with respect to the phase-mask needs a precision of ~1 µm and should have a maximum travel of a few hundred microns in order to make use of the full potential of the method. However, less precise stages and/or stages with lesser travels can of course be used.

A collimated beam on the phase-mask is preferred in order to avoid any distortion coming from a diverging beam. The latter point can be addressed by providing the collimating lens 20 or a collimating telescope in its place before the phase-mask.

Some of the issues discussed above are summarised in the table I below.

TABLE I

| Comments\f | 10 mm | 15 mm | 18 mm | 20 mm | 22.6 mm |
|---|---|---|---|---|---|
| Minimum $\lambda_B$ | 553.1 nm | 819.7 nm | 1044.8 nm | 1229.3 nm | 1547.6 nm |
| Device length | ~6 cm | ~7 cm | ~8 cm | ~9 cm | ~10 cm |
| Tuning slope | 1.4 nm/ 10 µm | 1 nm/ 10 µm | 0.83 nm/ 10 µm | 0.75 nm/ 10 µm | 0.7 nm/ 10 µm |

The numbers in table I are based on $\lambda_{pm}$=1060 nm $\lambda_i$=244 nm $n_{ave}$=1.46

Lens diameter; 25.4 mm

FIGS. 3a, 3b, 4a and 4b illustrate empirical results obtained with a prototype device according to FIG. 1.

Figure 3A:
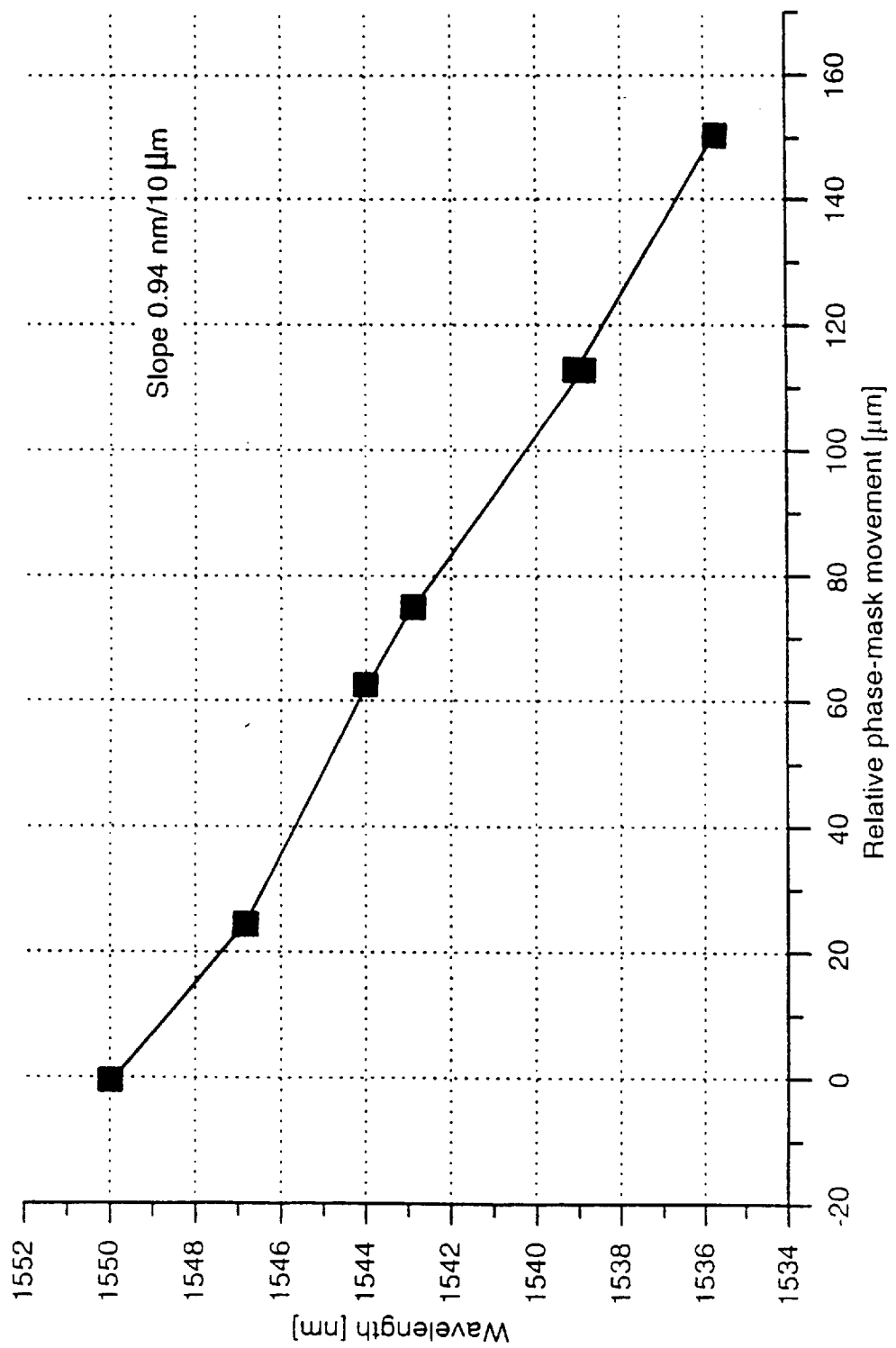
FIG. 3a illustrates an empirical tuning curve for a lens with f=17.7 mm, with a fixed lens position and a moving phase-mask position.
Figure 3B:
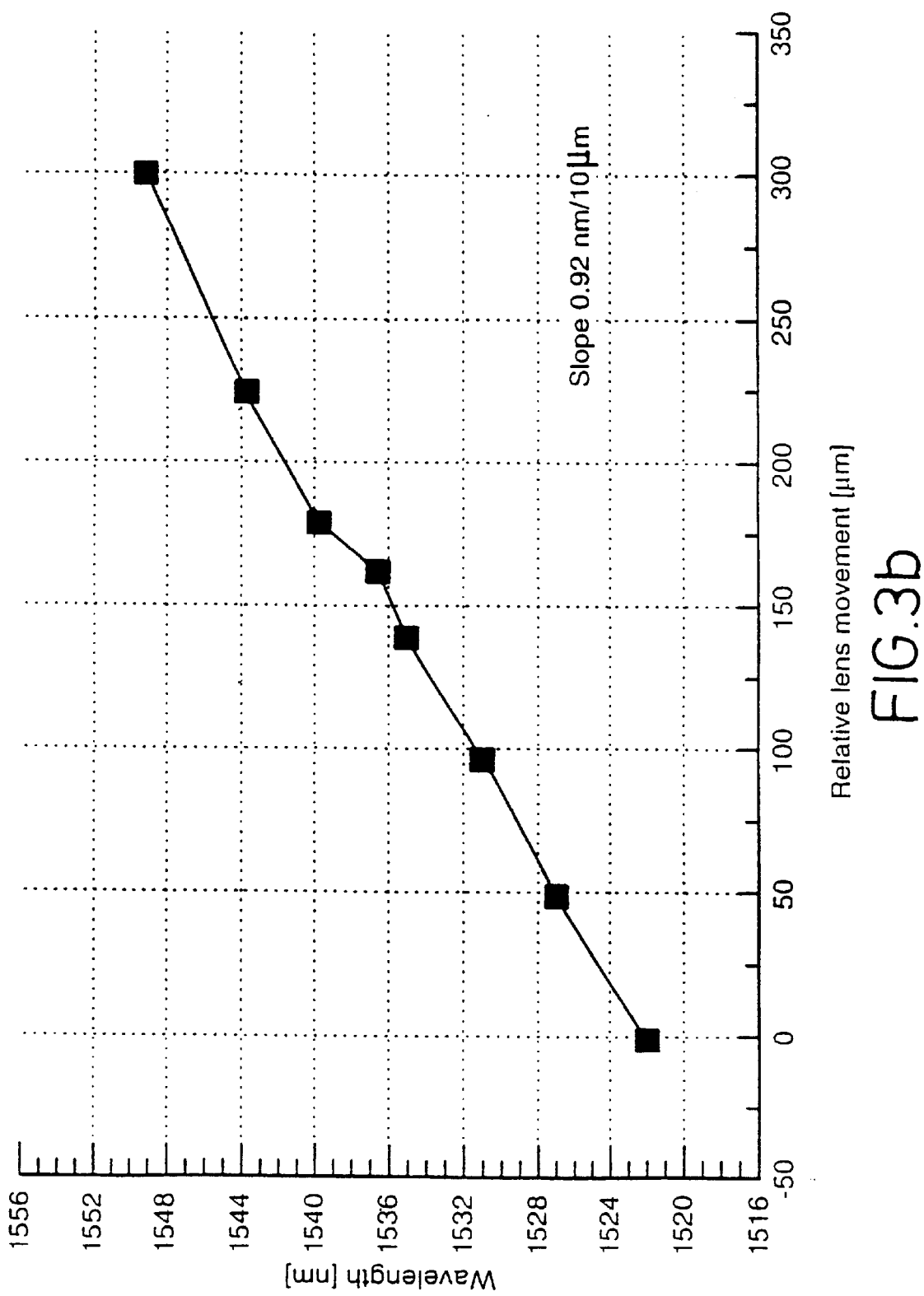
FIG. 3b illustrates an empirical tuning curve for a lens with f=17.7 mm, with a fixed phase-mask position and a moving lens position.

FIGS. 3a and 3b illustrate two tuning curves obtained for a lens with a focal length f=17.7 mm and $\lambda_{pm}$=1057.1 nm. FIG. 3a shows a tuning range from 1535.5 nm to 1550 nm with a slope of 0.94 nm/10 µm obtained by moving the phase-mask and keeping the lens in a fixed position. FIG. 3b shows a tuning range from 1522 nm to 1549 nm with a slope of 0.92 nm/10 µm obtained by moving the lens and for fixed phase-mask position.

Figure 4A:
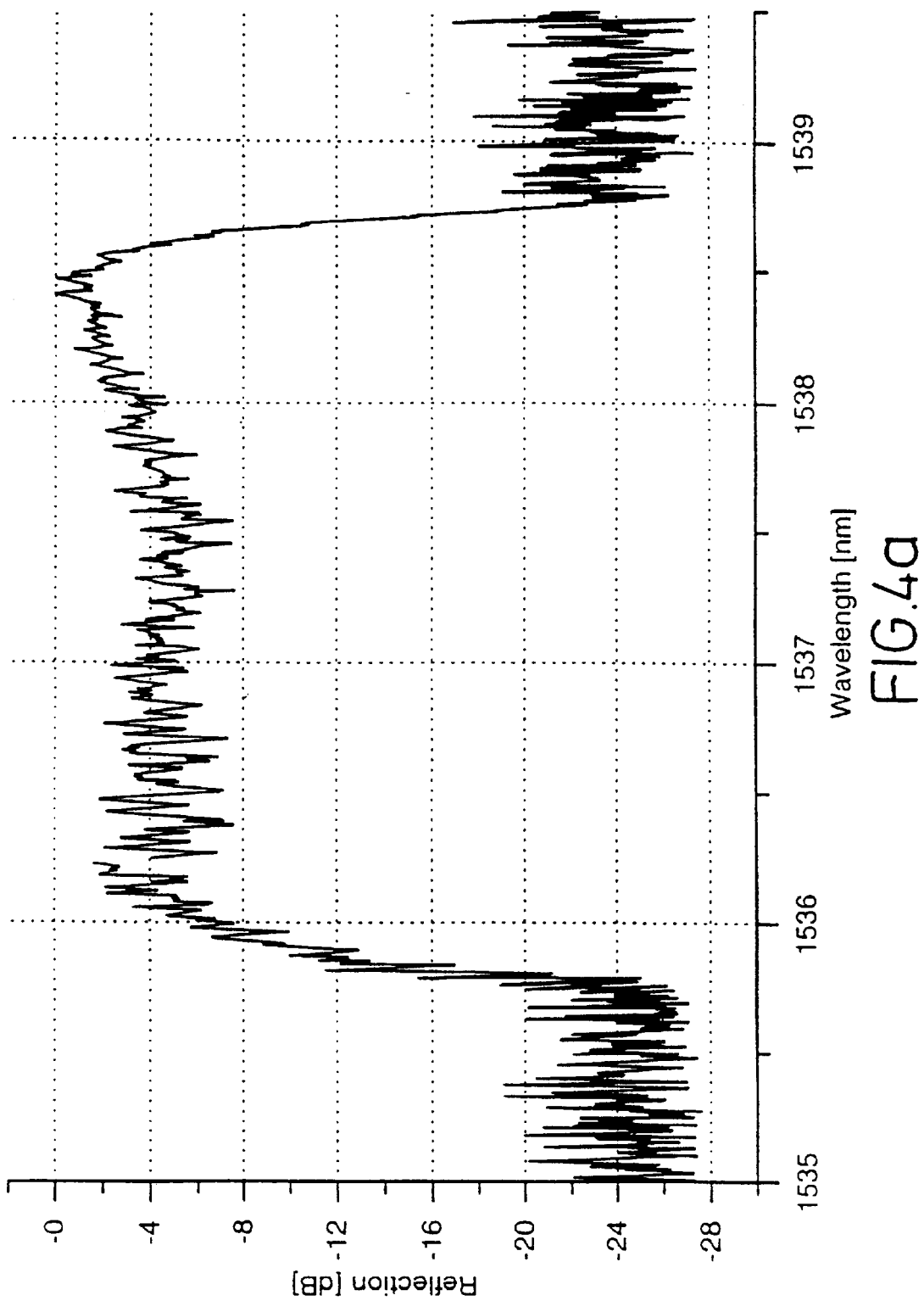
FIGS. 4a and 4b illustrate empirical reflection and time delay characteristics of a 85 cm long linearly chirped fibre grating written with the interferometer of FIG. 1.
Figure 4B:
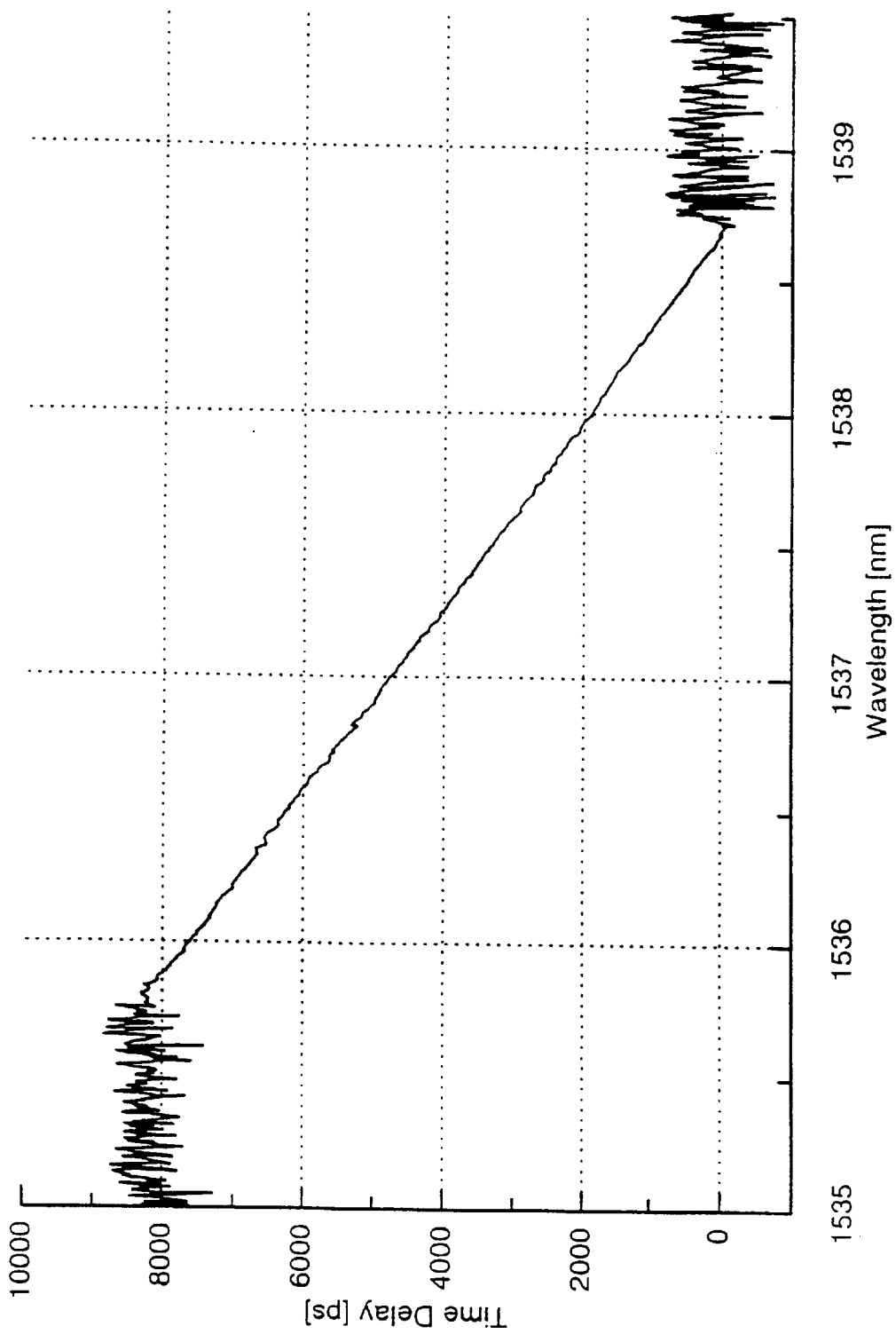

FIGS. 4a and 4b illustrate empirical reflection and time delay characteristics of a linearly chirped fibre grating written with the interferometer of FIG. 1. The grating is 85 cm long has a 3 nm bandwidth and is written using 100 mW of CW UV-light from a frequency doubled Ar-ion laser. The grating is written in a $D_2$-loaded high NA (0.2) fibre.

The advantage of using a bi-convex lens to catch and recombine the diffracted orders from the phase mask is that it is known as the 'best form' for 1:1 imaging. This because it does not introduce any aberrations. Furthermore the embodiment is simple and robust it employs only one lens element within the interferometer. Moreover, by blocking the transmitted 0th order beam from the phase mask a better visibility is obtained in the interference pattern between the interfering −1 and 1 orders.

Certain precautions can be taken into account in order to further improve the performance of the interferometer of FIG. 1. One of these is that the best results are expected to be obtained when the interference point in the imaging plane is composed of plane waves. This is obtained by focusing the collimated writing beam on to the phase mask with a lens that has exactly twice the focal length to that of the interferometer lens itself.

The apparatus of FIG. 1 has been used to produce an 85 cm long chirped fibre grating written with an interferometer with a 1 inch diameter lens to show the practicality of such a device in terms of the compactness (a prototype device length of just ~7 cm), but the skilled man will of course appreciate that interferometers with bigger lenses might be more practical for specific purposes, where the reduced tolerance on the tuning of the Bragg wavelength from bigger lenses might be perceived as an advantage.

The apparatus, as mentioned above, lends itself to use with a system such as that described in GB9617688.8, namely a technique involving fabricating an optical waveguide grating having a plurality of grating lines of refractive index variation, the and comprising the steps of:

(i) repeatedly exposing a spatially periodic writing light pattern onto a photosensitive optical waveguide; and (ii) moving the writing light pattern and/or the waveguide between successive exposures of the writing light pattern, so that each of at least a majority of the grating lines is generated by at least two exposures to different respective regions of the writing light pattern.

In such a technique. the apparatus and methods described earlier can easily be used to provide a writing light beam of varying grating pitch. The movement between the writing beams and the waveguide can be achieved by one or more translation stages or possibly by tilting the lens 60.

PUBLICATION REFERENCES

[Meltz] MELTZ, G., MOREY, W. W. and GLENN, W. H.: 'Formation of Bragg gratings in optical fibers by a transverse holographic method', Optics Lett., 14, (15), pp. 823–825, 1989.

[Anderson] ANDERSON, D. Z., MIZRAHI, V., ERDOGAN, T. and WHITE, A. E.: 'Production of in-fibre gratings using a diffractive optical element', Electron. Lett., 29, (6), pp. 566–568, 1993.

[Hill] HILL, K. O., MALO, B., BILODEAU, F., JOHNSON, D. C. and ALBERT, J.: 'Bragg gratings fabricated in monomode photosensitive optical fiber by UV exposure through a phase mask', Appl. Phys. Lett., 62, (10), pp. 1035–1037, 1993.

[Malo] MALO, B., HILL, K. O., BILODEAU, F., JOHNSON, D. C. and ALBERT, J.: 'Point-by-point fabrication of micro-Bragg gratings in photosensitive fibre using single excimer pulse refractive index modification techniques', Electron. Lett., 29, (18), pp. 1668–1669, 1993.

[Broer] BROER, M. M., CONE, R, L. and SIMPSON, J. R.: 'Ultraviolet-induced distributed-feedback gratings in $Ce^{3+}$-doped silica optical fibers', Optics Lett., 16, (18), pp. 1391–1393, 1991.

[Armitage] ARMITAGE, J. R.: 'Fibre Bragg reflectors written at 262 nm using a frequency quadrupled diode-pumped $Nd^{3+}$: YLF laser', Electron. Lett., 29, (13), pp. 1181–1183, 1993.

[Prohaska] PROHASKA, J. D. SNITZER, E., RISHTON, S. and BOEGLI, V.: 'Magnification of mask fabricated fibre Bragg gratings', Electron. Lett., 29. (18), pp. 1614–1615, 1993.

[Cole] COLE, M. J., LOH, W. H., LAMING, R. I., ZERVAS, M. N. and BARCELOS, S.: 'Moving fibre/phase mask scanning beam technique for enhanced flexibility in producing fibre gratings with a uniform phase mask', Electron. Lett., 31, (12), pp. 1488–1489, 1995.

[Ouellette] OUELLETTE, F., KRUG, P. A. and PASMAN, R.: 'Characterization of long phase masks for writing fiber Bragg gratings', Optical Fiber Technol., 2, (3), pp. 281–284, 1996.

What is claimed is:

1. Optical grating fabrication apparatus comprising:

a phase mask for dividing an incident light beam into a plurality of diffracted beams;

a focusing arrangement having an optical axis extending approximately perpendicular to the phase mask so as to receive light from the phase mask and converge at least two non-zero-order diffracted beams together so as to generate an interference region of a characteristic period between the converged beams so that a grating structure can be impressed on an optical waveguide placed in the interference region; and a translation stage arranged to move at least one of the phase mask and at least a part of the focusing arrangement so as to alter their relative separation along the optical axis under control of a control circuit and thereby alter the angle of convergence of the converged beams and thus controllably tune the characteristic period.

2. Apparatus according to claim 1, in which the focusing arrangement consists of a single lens.

3. Apparatus according to claim 2, in which the lens is a biconvex spherical lens.

4. Apparatus according to claim 1, comprising a collimating arrangement for substantially collimating the beam incident on the phase mask.

5. Apparatus according to claim 4, in which the focusing arrangement comprises a first lens and the collimating arrangement comprises a second lens that has twice the focal length as that of the first lens.

6. Apparatus according to claim 1, comprising a translation apparatus for providing relative translation of the grating fabrication apparatus and an optical waveguide in which a grat ing is to be fabricated, so that the interference region can be incident on different portions of the optical waveguide.

7. Apparatus according to claim 1, in which the waveguide is an optical fibre waveguide.

8. Apparatus according to claim 1, the apparatus comprising means for repeatedly exposing the interference region onto the waveguide; and means for moving the interference region and/or the waveguide between successive exposures of the writing light pattern, so that each of at least a majority of the grating lines of the waveguide grating is generated by at least two exposures to the interference region.

9. An optical grating fabrication method comprising the steps of:

directing a light beam onto a phase mask to divide the light beam into a plurality of diffracted beams;

converging at least two non-zero-order diffracted beams together using a focusing arrangement having an optical axis extending approximately perpendicular to the phase mask so as to generate an interference region of a characteristic period between the converged beams so that a grating structure can be impressed on an optical waveguide placed in the interference regions; and causing relative movement between the phase mask and at least a part of the focusing arrangement to alter their relative separation along the optical axis so as to alter the angle of convergence of the converged beams and tune the characteristic period to a desired period.

10. A method according to claim 9, wherein the relative separation is altered as the optical waveguide is moved through the interference region to fabricate a chirped grating.

* * * * *